(12) United States Patent
Rochen et al.

(10) Patent No.: US 10,016,918 B2
(45) Date of Patent: Jul. 10, 2018

(54) FLOW RESISTANT PACKING ELEMENT SYSTEM FOR COMPOSITE PLUG

(71) Applicant: Weatherford Technology Holdings, LLC, Houston, TX (US)

(72) Inventors: James A. Rochen, Waller, TX (US); Jonathan A. Young, Houston, TX (US); Nauman H. Mhaskar, Houston, TX (US)

(73) Assignee: Weatherford Technology Holdings, LLC, Houston, TX (US)

( * ) Notice: Subject to any disclaimer, the term of this patent is extended or adjusted under 35 U.S.C. 154(b) by 283 days.

(21) Appl. No.: 14/827,460

(22) Filed: Aug. 17, 2015

(65) Prior Publication Data

US 2016/0061000 A1    Mar. 3, 2016

Related U.S. Application Data

(60) Provisional application No. 62/044,223, filed on Aug. 30, 2014.

(51) Int. Cl.
| | |
|---|---|
| *E21B 33/129* | (2006.01) |
| *B29C 45/14* | (2006.01) |
| *E21B 33/12* | (2006.01) |

(52) U.S. Cl.
CPC .......... *B29C 45/14* (2013.01); *E21B 33/1216* (2013.01); *E21B 33/1292* (2013.01)

(58) Field of Classification Search
CPC .. E21B 33/1216; E21B 33/1292; B29C 45/14
USPC ...................................................... 166/138
See application file for complete search history.

(56) References Cited

U.S. PATENT DOCUMENTS

| | | | |
|---|---|---|---|
| 2,194,331 | A | 3/1940 | Strom |
| 4,637,468 | A | 1/1987 | Derrick |
| 5,165,703 | A | 11/1992 | Morvant |
| 5,197,542 | A | 3/1993 | Coone |
| 5,311,938 | A | 5/1994 | Hendrickson et al. |
| 5,398,763 | A | 3/1995 | Watson et al. |
| 5,542,473 | A | 8/1996 | Pringle et al. |
| 5,701,959 | A | 12/1997 | Hushbeck et al. |
| 6,142,231 | A | 11/2000 | Myers, Jr. et al. |
| 6,167,963 | B1 | 1/2001 | McMahan et al. |
| 6,230,798 | B1 | 5/2001 | Appleton |

(Continued)

OTHER PUBLICATIONS

First Office Action in counterpart Canadian Appl. 2,901,560, dated Jul. 12, 2016, 3-pgs.

(Continued)

*Primary Examiner* — Taras P Bemko
(74) *Attorney, Agent, or Firm* — Blank Rome LLP (57) ABSTRACT

A downhole tool, such as a composite bridge plug, has a packing element disposed on a mandrel of the tool adjacent an activating element, such as a cone and slip arrangement. The packing element includes a packer and at least one backup ring. The packer is composed of packing material and is compressible on the downhole tool at least in part due to the activating element. The at least one backup ring limits extrusion of the packer. The at least one backup ring is molded into the packing material at one end of the packer adjacent the activating element. Preferably, each end of the packer has at least two backup rings molded therein, and slots in the adjacent backup rings are preferably offset at the ends.

27 Claims, 7 Drawing Sheets

(56) References Cited

U.S. PATENT DOCUMENTS

| | | |
|---|---|---|
| 6,394,184 B2 | 5/2002 | Tolman et al. |
| 7,044,230 B2 | 5/2006 | Starr et al. |
| 7,168,494 B2 | 1/2007 | Starr et al. |
| 7,210,533 B2 | 5/2007 | Starr et al. |
| 7,350,582 B2 | 4/2008 | McKeachnie et al. |
| 7,806,193 B2 | 10/2010 | Berzin et al. |
| 8,167,033 B2 | 5/2012 | White |
| 8,191,625 B2 | 6/2012 | Porter et al. |
| 8,267,177 B1 | 9/2012 | Vogel et al. |
| 8,408,290 B2 | 4/2013 | Porter et al. |
| 9,033,041 B2 | 5/2015 | Baihly et al. |
| 2005/0205264 A1 | 9/2005 | Starr et al. |
| 2005/0205265 A1 | 9/2005 | Todd et al. |
| 2007/0277979 A1 | 12/2007 | Todd et al. |
| 2008/0271898 A1 | 11/2008 | Turley et al. |
| 2009/0139707 A1* | 6/2009 | Berzin ............... E21B 33/1208 166/118 |
| 2010/0101803 A1 | 4/2010 | Clayton et al. |
| 2010/0101807 A1 | 4/2010 | Greenlee et al. |
| 2011/0048743 A1 | 3/2011 | Stafford et al. |
| 2011/0061857 A1* | 3/2011 | White ............... E21B 33/1216 166/196 |
| 2011/0079383 A1* | 4/2011 | Porter ............... E21B 33/1277 166/118 |
| 2011/0265986 A1* | 11/2011 | Porter ............... E21B 33/1208 166/134 |
| 2013/0269930 A1 | 10/2013 | Neer |
| 2014/0014371 A1 | 1/2014 | Jacob et al. |
| 2014/0190682 A1 | 7/2014 | Greenlee et al. |
| 2014/0202708 A1 | 7/2014 | Jacob et al. |

OTHER PUBLICATIONS

Second Office Action in counterpart Canadian Appl. 2,901,560, dated Feb. 24, 2017, 3-pgs.

* cited by examiner

FLOW RESISTANT PACKING ELEMENT SYSTEM FOR COMPOSITE PLUG

CROSS-REFERENCE TO RELATED APPLICATIONS

This application claims the benefit of U.S. Provisional Appl. 62/044,223, filed 30 Aug. 2014, which is incorporated herein by reference.

BACKGROUND OF THE DISCLOSURE

Figure 1:
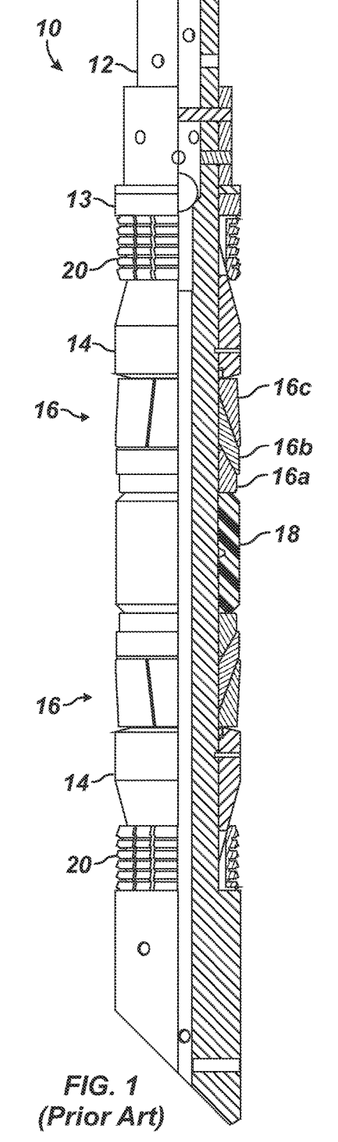
FIG. 1 illustrates a downhole tool in partial cross-section having a packing element system according to the prior art.

Packing element systems used on composite plugs are typically designed as individual components comprised of a rubber packing element and a back-up extrusion resistant component. For example, FIG. 1 illustrates a composite plug 10 in partial cross-section. The plug 10 has a mandrel 12 with cones 14 and backup systems 16 arranged on both sides of a packing element 18. Outside the inclined cones 14, the plug 10 has slips 20. As shown here, the slips 20 can be a conventional wicker-type slip typically composed of cast iron.

The backup systems 16 have several elements, namely a wedge ring 16a composed of a composite, a solid backup ring 16b composed of Polytetrafluoroethylene (PTFE), and a slotted ring 16c composed of a composite. When deployed downhole, the plug 10 is activated by a wireline setting tool (not shown), which uses conventional techniques of pulling against the mandrel 12 while simultaneously pushing against a push ring 13. As a result, the element system (i.e., packing element 18, cones 14, backup systems 16, and slips 20) is compressed along the axis of the mandrel 12. In particular, the slips 20 ride up the cones 14, the cones 14 move along the mandrel 12 toward one another, and the packing element 18 compresses and extends outward to engage a surrounding casing wall.

During the compression and extension of the packing element 18, the backup systems 16 control the extrusion of the packing element 18 so that the material does not overly extrude axially, which would weaken any resultant seal. The slips 20 are pushed outward in the process to engage the wall of the casing, which both maintains the plug 10 in place in the casing and keeps the packing element 18 contained.

As will be appreciated, the plug 10 and most of its components are preferably composed of millable materials because the plug 10 is milled out of the casing once operations are done, as noted previously. As many as fifty such plugs 10 can be used in one well and must be milled out at the end of operations. Therefore, having reliable plugs 10 composed of entirely (or mostly) of millable material is of particular interest to operators. As noted above, the solid backup rings 16b of the backup systems 16 are typically compose of PTFE or similar material. Such a material can cause problems during mill up of the tool 10, leaving a ring of material, tending to gum up, etc.

To deploy the plug 10 downhole, operators may need to pump the plug 10 along the wellbore. For instance, the plug 10 may be pumped down a horizontal section of a wellbore at extremely high pump rates that create a high fluid velocity across the plug 10. The high fluid velocity, which can be in excess of 50 ft./sec., may cause the element system (i.e., packing element 18, backup systems 16, slips 20, etc.) to pre-set while running in the wellbore. For example, should the plug 10 be stalled for whatever reason in the casing during run-in, the high velocity of fluid used to pump the plug 10 may flare out components of the backup system 16, expanding it like a sail and causing pre-setting of the element system 30.

As will be appreciated, pre-setting of the plug 10 can be catastrophic and may require operators to use coil tubing to drill up the pre-set plug 10, which can be very costly. Even though there is a risk of pre-setting, operators still want to run the plug 10 in the hole at higher rates because this reduces the rig time costs. In other situations, operators want to run the plug 10 at higher rates due to the extended reach of the well.

In addition, as the composite plugs are pumped downhole, the slips 20 have the potential to flare out due to high fluid velocities past them. The slips 20 can also incur physical damage while tripping downhole or mishandling of the composite plug. One solution to these issues has been to increase the break load on the upper slip 20, adding pins to the upper cone 14 and/or using yield bands. Still, even these mechanical fastening means can be prone to damage during run-in.

To prevent pre-setting, the element system (i.e., packing element 18, backup systems 16, slips 20, etc.) of the plugs 10 have also been designed with different geometries. Adhesives have been used to glue components together, or the components have been wrapped with a shrink fit. However, pre-setting still occurs, and the conventional element system has created limitations on the speed that a plug 10 can be run in the hole.

In other related aspects of plugs with packing elements, it is known in the art to use other types of anti-extrusion devices. For example, U.S. Pat. No. 8,167,033 discloses anti-extrusion rings that have hard segments surrounded by an elastic matrix. The hard segments expand to form a near solid ring of rigid material within the elastomeric matrix to prevent extrusion of the packing element.

Additionally, it is known in the art to embed slip type components in the packing element of a plug. For example, U.S. Pat. No. 2,194,331 discloses a plug having a packing element with embedded metal pieces that help securely engage in the casing.

The subject matter of the present disclosure is directed to overcoming, or at least reducing the effects of, one or more of the problems set forth above.

SUMMARY OF THE DISCLOSURE

An element system for a downhole tool includes a packer with at least one co-molded element. The packer positions on the downhole tool. For example, the packer can be a sleeve disposed on a mandrel of the downhole tool adjacent and activating element. The packer is composed of packing material and is compressible on the downhole tool. The at least one element is co-molded directly into the packing material at at least one end of the packer. The at least one co-molded element at least partially limits extrusion of the packing material axially past the at least one element beyond the at least one end of the packer.

In one embodiment, the at least one element includes at least one backup ring, which can define a plurality slots longitudinally therein and disposed about of the at least one backup ring. In fact, at least two backup rings can be used next to each other, and the slots of the at least two backup rings can be offset from one another. In another embodiment, the at least one co-molded element can include first and second backup rings molded into the packing material at opposing ends of the packer.

In one arrangement, at least a portion of the at least one end of the packer at least partially covers an exterior of the at least one backup ring. The at least one backup ring can include an endwall exposed beyond the packing material.

In another embodiment, the at least one co-molded element includes a first slip co-molded directly into the packing material at the at least one end of the packer. A second slip can be co-molded directly into the packing material at an opposite end of the packer.

A method of manufacturing a packing element for a downhole tool involves positioning at least one element in a mold; molding a packer of packing material in the mold; and adapting the at least one element to at least partially limit extrusion of the packing material axially past the at least one element beyond at least one end of the packer by co-molding the at least one element directly into the packing material at the at least one end of the packer.

To position the at least one element in the mold, at least one backup ring can be positioned in the mold with a plurality slots disposed around a circumference of the at least one backup element. In an example, at least two backup rings can be positioned in the mold with the slots of the at least two backup rings being offset from one another. Backup rings can be molded directly into the packing material at opposing ends of the packer.

When molding the at least one element directly into the packing material at the at least one end of the packer, at least a portion of the at least one end of the packer can at least partially cover an exterior of the at least one element. An endwall of the at least one element can be exposed beyond the packing material. At least one slip can also position in the mold to be molded with the packing material.

The foregoing summary is not intended to summarize each potential embodiment or every aspect of the present disclosure.

DETAILED DESCRIPTION OF THE DISCLOSURE

Figure 2A:
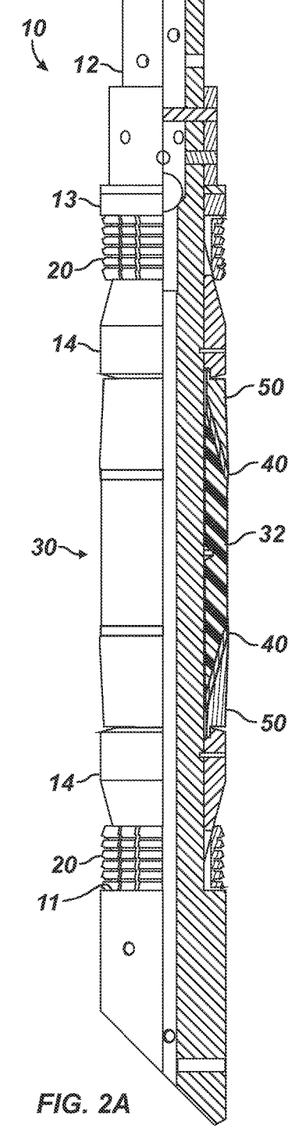
FIGS. 2A-2B illustrate downhole tools in partial cross-section having packing element systems according to the present disclosure.
Figure 2B:
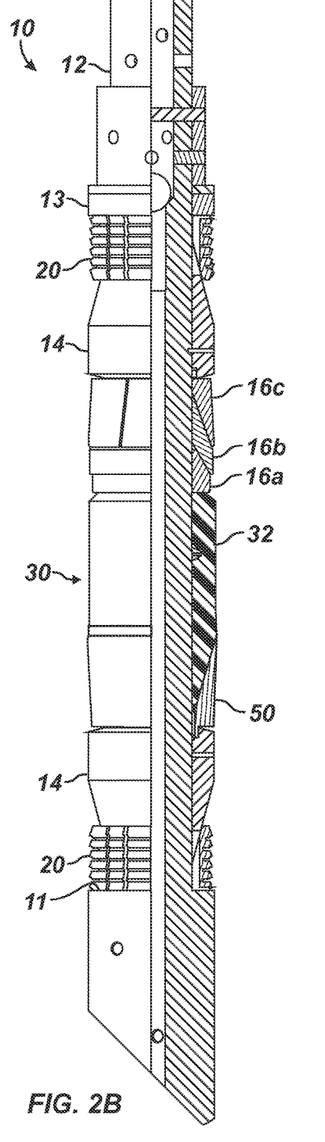

FIGS. 2A-2B illustrate downhole tools 10 in partial cross-section having packing element systems 30 according to the present disclosure. The downhole tool 10 can be a composite plug as shown, but it could also be a packer, a liner hanger, an anchoring device, or other downhole tool. The plug 10 has a mandrel 12 having cones 14 arranged on both sides of the element system 30. Outside the inclined cones 14, the plug 10 has slips 20, which may be conventional wicker-type slips or other type of slips having inserts or buttons.

The composite plug 10 is preferably composed mostly of non-metallic components according to procedures and details as disclosed, for example, in U.S. Pat. No. 7,124,831, which is incorporated herein by reference in its entirety. This makes the plug 10 easy to mill out after use.

When deployed downhole, the plug 10 is activated by a wireline setting tool (not shown), which uses conventional techniques of pulling against the mandrel 12 while simultaneously pushing against the push ring 13. The element system 30 is compressed axially between activating elements (e.g., the push ring 13 at the uphole end and the mandrel's shoulder 11 at the downhole end). As a result, the slips 20 ride up the cones 14, the cones 14 move along the mandrel 12 toward one another, and the packing element 32 compresses and extends outward to engage a surrounding casing wall. The slips 20 are pushed outward in the process to engage the wall of casing, which both maintains the plug 10 in place in the casing and keeps the element system 30 contained.

The force used to set the plug 10 may be as high as 30,000 lbf. and could even be as high as 85,000 lbf. These values are only meant to be examples and could vary for the size of the plug 10. In any event, once set, the plug 10 isolates upper and lower portions of the casing so that fracture treatment or other operations can be performed. When used during fracture operations, for example, the plug 10 may isolate pressures of 10,000 psi or so uphole of the plug 10, while pressure is kept from downhole locations.

As will be appreciated, any slipping or loosening of the plug 10 can compromise operations. Therefore, it is important that the slips 20 sufficiently grip the inside of the casing. At the same time, however, the plug 10 and most of its components are preferably composed of millable materials because the plug 10 is milled out of the casing once operations are done, as noted previously. As many as fifty such plugs 10 in the form of plugs can be used in one well and must be milled out at the end of operations. Therefore, having reliable plugs 10 composed of entirely (or mostly) of millable material is of particular interest to operators.

The plug 10 in FIG. 2A has a symmetrically-arranged element system 30 and may be configured for use as a bridge plug to isolate pressures above and below the plug 10 when set in casing. By contrast, the plug 10 in FIG. 2B has an asymmetrically-arranged element system 30 and may be configured for use as a fracture plug to isolate pressure from above when set in casing. In this asymmetrical arrangement, molded components of the element system 30 are used for the downhole end of the plug 10, while conventional cone 14 and extrusion rings 16 are used for the uphole end. Although not shown, a reverse arrangement could be used depending on the needs of a particular implementation.

Due to the configuration of the element system 30 as disclosed herein, the overall length of the plug 10 or portions thereof can be reduced in length by about 6-in. or more. This shortening is not strictly depicted in the figures.

Figure 3A:
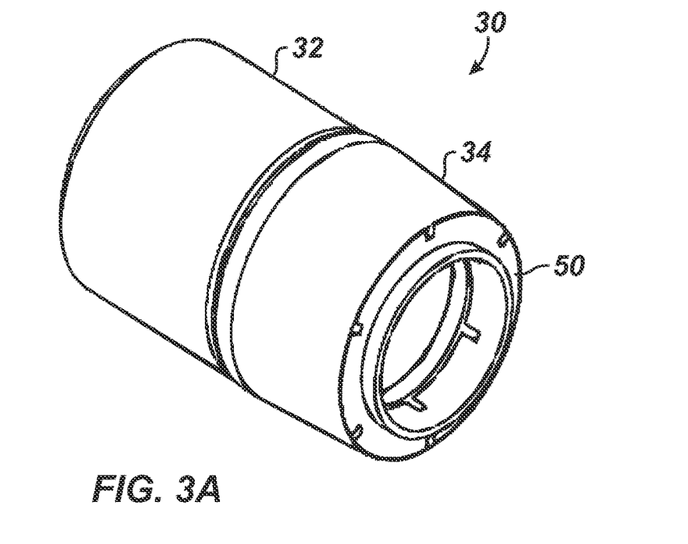
FIG. 3A illustrates a perspective view of one end of the disclosed element system in a molded state.

FIG. 3A illustrates a perspective view of one end of the disclosed element system 30 as molded for the plug 10 of FIG. 2B. Additionally, FIG. 3B illustrates a perspective view of the end of the disclosed element system 30 diagrammatically disassembled.

The element system 30 includes a molded packing element or packer 32 and includes anti-extrusion or backup elements 40 and 50. As best shown in FIG. 3A, the molded packer 32 is a sleeve, which is composed of an elastomer material that is compressible. The packer 32 is co-molded with the backup elements 40, 50 and encompasses them. In other words, the elastomer material of the packer 32 is molded into the interstices of the backup elements 40, 50—i.e., into the small openings, spaces, gaps, etc. around, between, in, etc. the elements 40, 50. In turn, the backup elements 40 and 50 interstitially molded with packer 32 control the extrusion of the packing element 32. An end or cover 34 of the packing packer 32 may extend molded (at least partially or entirely) over the backup elements 40 and 50.

Figure 3B:
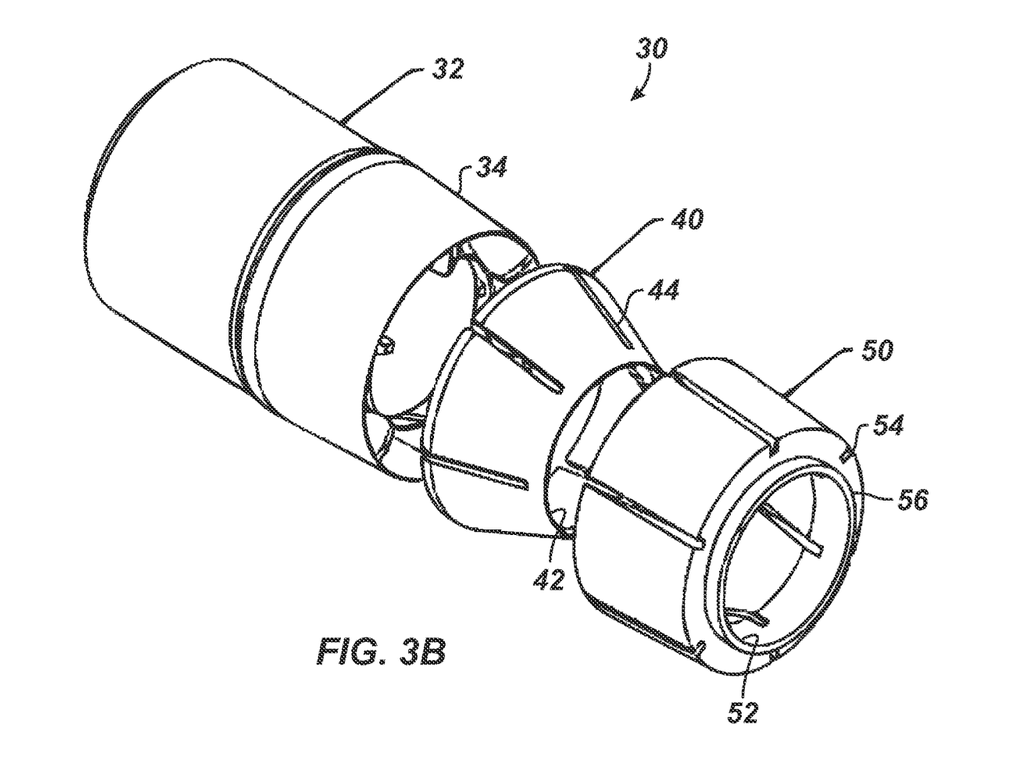
FIG. 3B illustrates a perspective view of the end of the disclosed element system in diagrammatic disassembly.

As diagrammed in FIG. 3B, the backup elements 40 and 50 can include one or more back-up or anti-extrusion rings, which can be composed of a composite (non-metallic) material or any other suitable material. For higher temperature and pressure ratings, at least two slotted rings 40 and 50 can be used. The slots 44, 54 are defined longitudinally and are spaced around the circumference of the rings 40, 50. The slots 44, 54 can be staggered to prevent extrusion of the compressed packer's material through the slots 44, 54 during application of pressures, such as pressures during a fracture operation. As will be appreciated, the size and number of the slots 44, 55 can be configured for a particular implementation.

For a conventional sized plug used in standard casing, the slots 44, 55 may be expected to be about ⅛-in. wide, although this may vary depending on the implementation. The width of the slots 44, 55 could be further reduced while still allowing for compression molding of the elastomer material of the packer 32 therebetween during the compression molding process to form the element system 30.

The first (inner) slotted ring 40 is a thin conical shape with a number of expandable petals separated by the slots 44. This inner ring 40 is embedded closer into the end of the element system 30. By contrast, the second (outer) slotted ring 50 has a thick cylindrical shape with a conical recess and with a number of expandable segments separated by the slots 54. This outer ring 50 fits adjacent the inner ring 40 so that the conical recess fits next to the conical shape of the inner ring 40. The thick, expandable segments of the outer ring 50 resist expanding outward as the element system 30 is run downhole on the tool 100 at high velocities and pressures. This can help prevent premature setting of the element system 30 during deployment.

As already hinted to above, the element system 30 is not assembled as individual components. Instead, the backup rings 40 and 50 are placed in a rubber mold prior to compression molding the packer 32. Once the compression molding process is complete, the backup rings 40 and 50 are contained or co-molded within the packer 32. After the compression molding, the element system 30 may be cured and finished according to standard practice.

The backup rings 40 and 50 may be at least partially or entirely covered by the end of the packer 32. For example, a thin film or layer 34 of the elastomer of the packer 32 may cover the outside of the backup rings 40 and 50, giving the element system 30 a streamline profile, although this is not strictly necessary.

As shown in FIG. 3A, only one end of the packer 32 is shown having the embedded back-up rings 40 and 50, while the other end may or may not have such embedded rings 40 and 50 as in FIGS. 2A-2B. As shown on the plug 10 in FIG. 2A, both ends of the packer 32 have backup rings 40 and 50 embedded therein. If only one end of the packer 32 has the embedded rings 40 and 50, the other end can be used with conventional backup components on the plug 10, such as those components depicted above with reference to FIG. 2B.

Figure 4A:
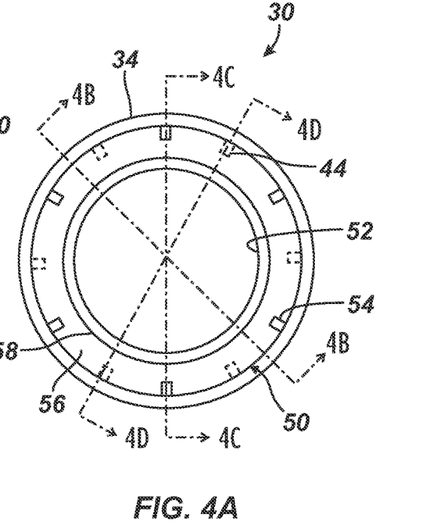
FIG. 4A illustrates an end view of one end of the disclosed element system.
Figure 4B:
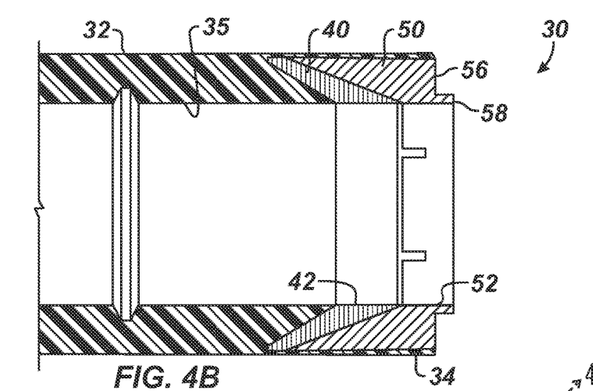
FIGS. 4B-4D illustrates cross-sectional views of the end of the disclosed element system at different orientations.
Figure 4C:
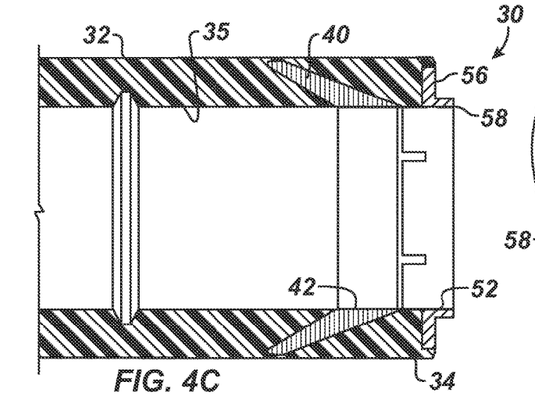
Figure 4D:
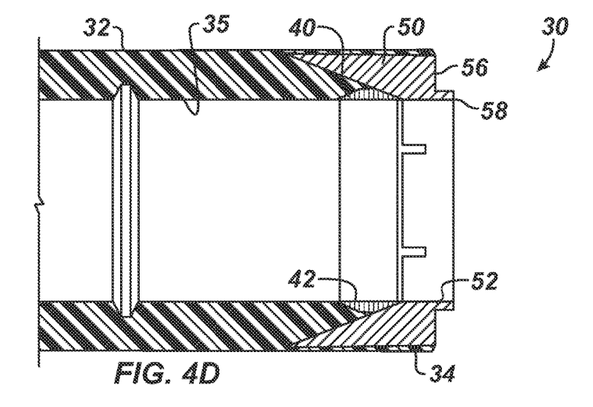
Figure 5A:
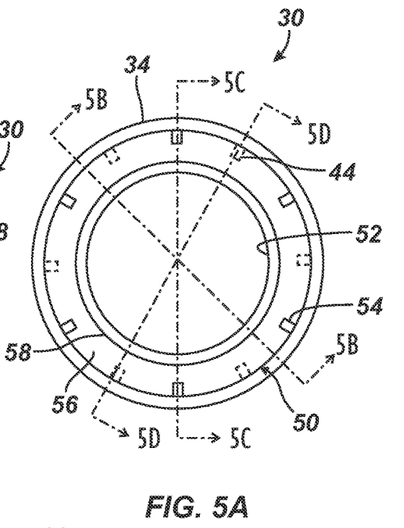
FIG. 5A illustrates an end view of one end of another arrangement of the disclosed element system.
Figure 5B:
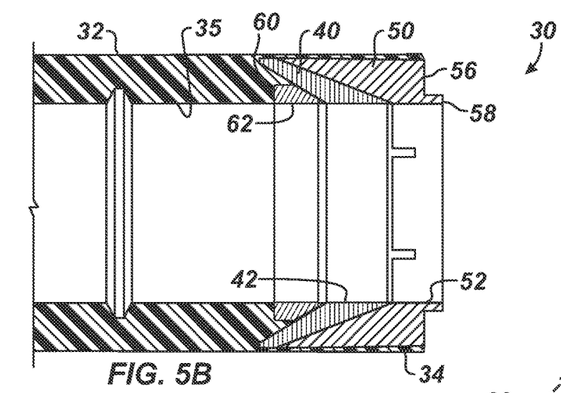
FIGS. 5B-5D illustrates cross-sectional views of the end of the disclosed element system in FIG. 5A at different orientations.
Figure 5C:
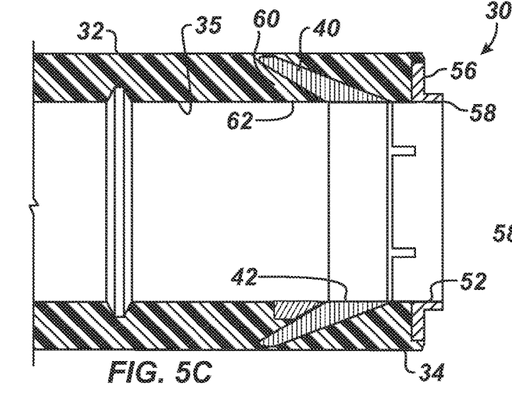
Figure 5D:
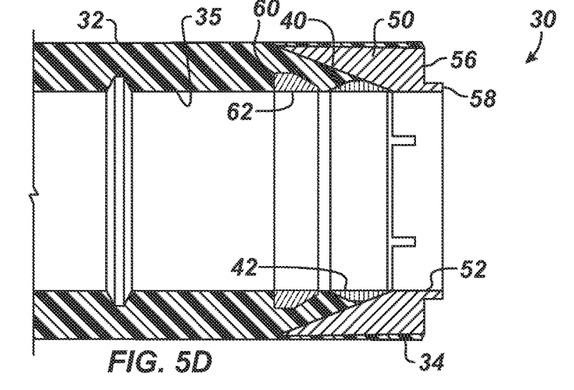

Further details of the element system 30 are discussed with reference to FIGS. 4A-4D. As shown in FIG. 4A, an end view shows one end of the disclosed element system 30. FIGS. 4B-4D illustrate cross-sectional views of the end of the disclosed element system 30 at different orientations.

In FIG. 4A, the outer backup ring 50 has an internal diameter 52 that fits on the mandrel (12) of the plug (10). The outer ring 50 is shown with its endwall 56 and lip 58 exposed. These fit against a cone (14) of the plug (10). See e.g., FIGS. 2A-2B. The several slots 54 of the outer ring 50 are disposed around the outer circumference of the ring 50, and the material of the packer 32 is molded into the slots 54. Additionally, the molded end 34 of the packer 32 can cover the outer circumference of the ring 50. Shown in dashed lines, the slots 44 of the inner backup ring 40 are offset from the outer ring's slots 54.

In the cross-section of FIG. 4B, the co-molding of the packer 32 and backup rings 40, 50 (i.e., molding under, over, between, etc.) is shown at an orientation lacking alignment with any of the slots 44, 54. By contrast in the cross-section of FIG. 4C, the co-molding of the packer 32 and the backup rings 40 and 50 is shown at an orientation aligned with the outer ring's slots 54, while the cross-section in FIG. 4D shows the co-molding at an orientation aligned with the inner ring's slots 44.

The segments of the outer ring 50 are wedged shape, defining a portion of the conical recess for fitting against the inner ring 40 and defining a cylindrical outer surface for completing the shape of the packer 32. The thickness of the inner ring 40 can be modified to alter its strength to meet the requirements of an implementation. As shown in FIGS. 4B-4D for example, the wedge profile of the inner ring 40 can make it stronger. Other variations are possible.

The materials of the inner and outer rings 40 and 50 may be the same or different. In particular, the inner ring 40 and the outer ring 50 can preferably both be composed of a composite material. Overall, the inner ring 40 may be intended to perform most of the anti-extrusion function for the element system 30.

In an alternative arrangement shown in comparable FIGS. 5A-5D, the element system 30 can also include a wedge ring 60 disposed adjacent the inner backup ring 40. This wedge ring 60 is co-molded together with the backup rings 40 and 50 in the elastomer of the packer 32. The wedge ring 60 includes an inner diameter 62 that fits on the mandrel (12). A wedged edge of the ring 60 may be oriented toward the inner ring 40. The wedge ring 60 can also be composed of composite material and can be a solid ring. During operations, the wedge ring 60 can help compress the packer 32 during the setting process.

Figure 6:
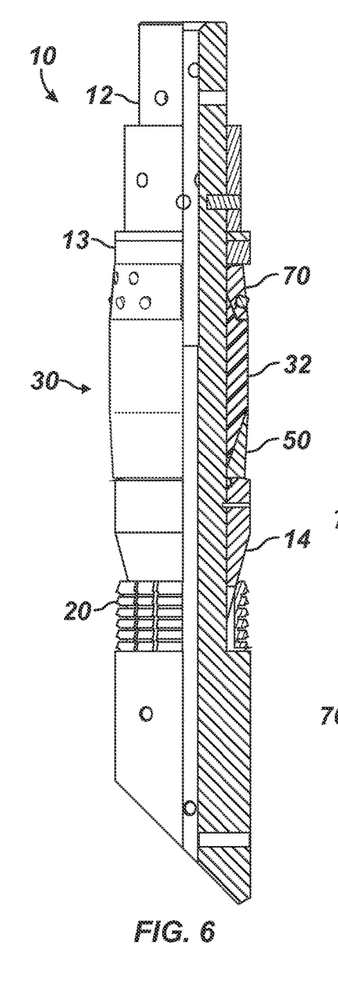
FIG. 6 illustrates a downhole tool in partial cross-section having yet another packing element system according to the present disclosure.

FIG. 6 illustrates a downhole tool 10 in partial cross-section having yet another element system 30 according to the present disclosure. The downhole tool 10 shown here can be a fracture plug used during a fracture operation, such as a plug and perf operation of casing.

The element system 30 includes a downhole slip 20, a cone 14, a packer 32, one or more backup rings 50, and uphole slip 70. When the plug 10 is deployed downhole in the casing, the uphole slip 70 only needs to hold back the elastomer of the packer 32 until a frac ball is deployed on the ball seat of the mandrel 12. In this element system 30, therefore, an upper cone is eliminated, and the uphole slip 70 is co-molded with the elastomer of the packer 32. In the end, this can make the plug 10 shorter, thus yielding a faster mill-up time. The co-molding of the slip 70 also helps prevent the uphole slip 70 from flaring out and breaking during run-in and damage incurred due to mishandling of plug 10.

Figure 7A:
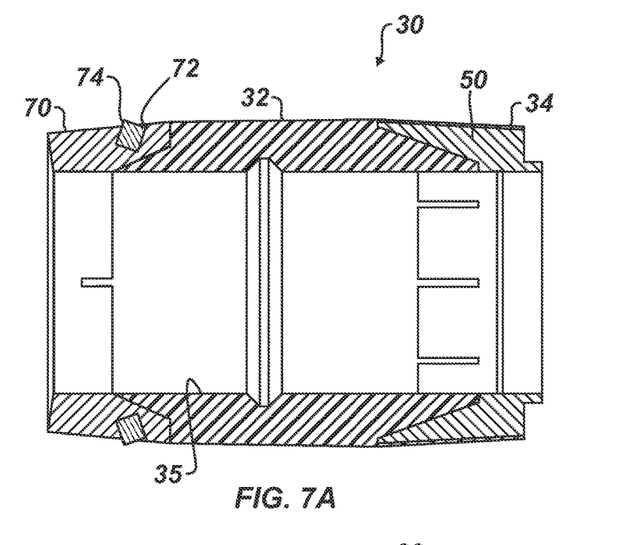
FIGS. 7A-7B illustrate cross-sectional and side views of the element system of FIG. 6.
Figure 7B:
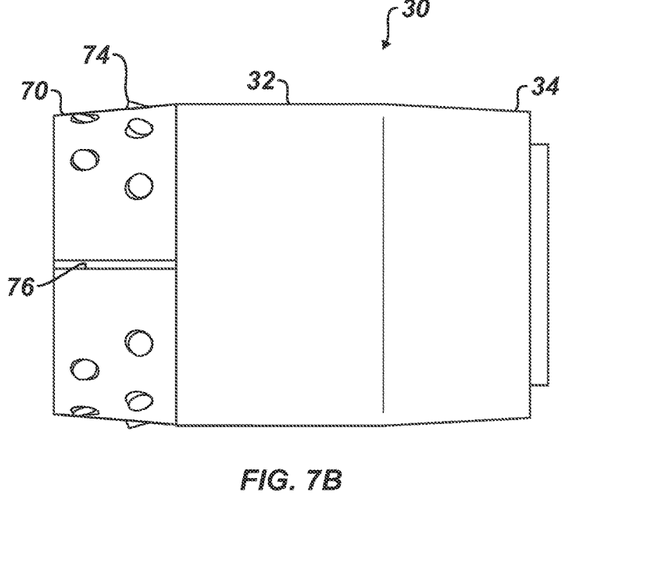

As shown in FIGS. 7A-7B, the one or more backup rings 50 are co-molded and incorporated on the downhole side of the packer 32. Only one backup ring 50 is shown, but it will be appreciated that additional rings (e.g., backup ring 40 and/or wedge ring 60) disclosed previously can be used. The one or more backup rings 50 can define slots as before through which the elastomer of the packer 32 can fill. Also, a layer 34 of elastomer may be molded over the outside of the backup rings 50 to further streamline the element system 30, as shown in FIGS. 7A-7B.

By contrast, the uphole slip 70 with buttons 74 is co-molded and incorporated on the uphole side of the packer 32. The uphole slip 70 can thereby act as an extrusion barrier. As this arrangement shows, the downhole backup ring 50 and the uphole slip 70 are co-molded with the elastomer to yield a single co-molded element 30 that is then positioned on the mandrel (12) of the plug (10) (See FIG. 6). Once assembled, the disclosed element system 30 has the uphole slip 70 encapsulated with the elastomer, making the system 30 more robust and streamlined for run-in.

The uphole slip 70 is formed as a ring having external holes 72 for inserts 74 and having a number of slits or divisions 76, making separable segments or arcuate members. The elastomer of the packer 32 can mold in the slits 76 and may not necessarily be molded over the outside of the slip 70, although it could. The slits 76 may not pass through the entire length of the slip 70 so that inside edges around the back end of the slip 70 can remain connected.

Figure 8:
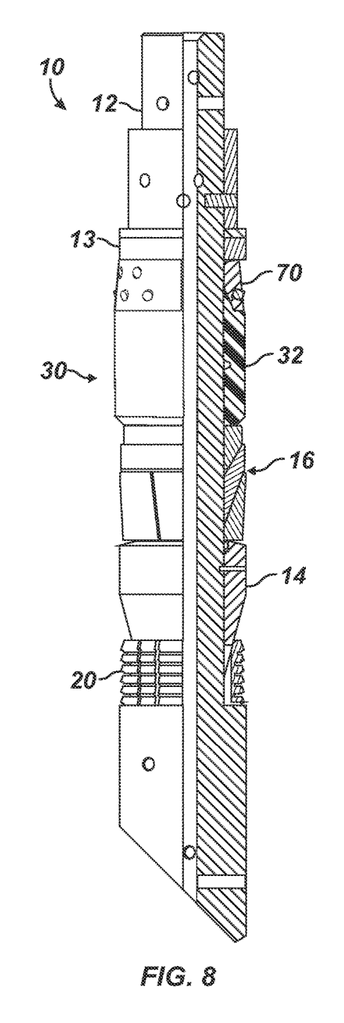
FIG. 8 illustrates a downhole tool in partial cross-section having yet another packing element system according to the present disclosure.

An alternative system shown in FIG. 8 may have the uphole slip 70 co-molded with the packer 32, but may use a conventional backup system 16 at the downhole end. The downhole tool 10 shown here can be a fracture plug used during a fracture operation, such as a plug and perf operation of casing.

The element system 30 includes a packer 32, backup system 16, and slips 20 and 70. In this element assembly 30, the conventional arrangement of slip 20, cone 14, and backup system 16 is used on the downhole end of the plug 10. An upper cone is eliminated, and the uphole slip 70 is co-molded with the elastomer of the packer 32.

Figure 9A:
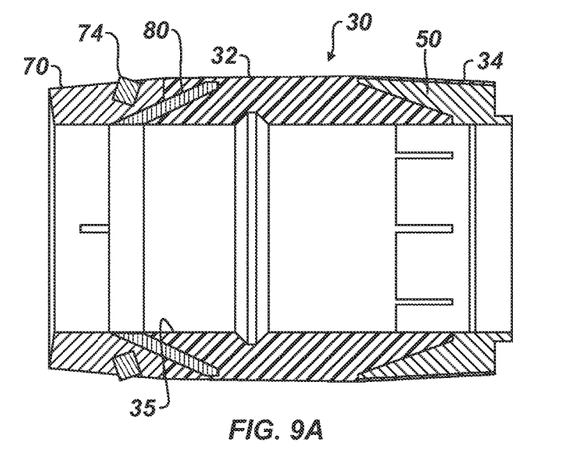
FIGS. 9A-9B illustrate partial cross-sectionals of additional packing element systems according to the present disclosure.
Figure 9B:
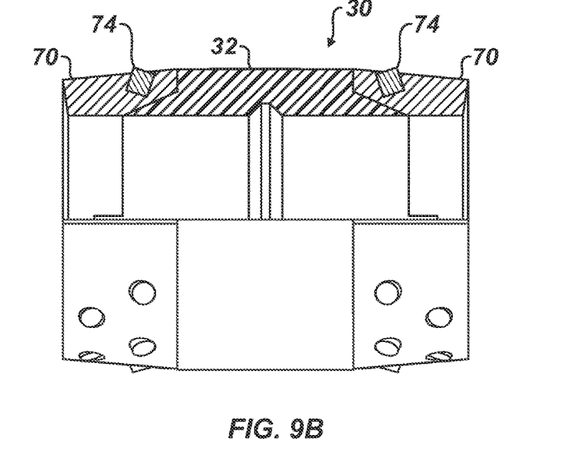

Another element system 30 shown in FIG. 9A can have one or more backup rings 80 co-molded along with the uphole slip 70 with the packer 32. The backup rings 80 can provide extrusion resistance for higher pressures at the uphole end of the packer 32. The backup rings 80 can be similar to those rings 40, 50, 60, etc. discussed previously. Yet another element system 30 shown in FIG. 9B can have uphole and downhole slips 70 co-molded with the packer 32 and may not directly use separate anti-extrusion rings (not shown), although it could have backup rings as disclosed herein.

As can be seen in the above examples, the packer 32 can be co-molded with one or more of: an upper slip 70; a lower slip 70; upper anti-extrusion ring(s) 40, 50, 60, and/or 80; and lower anti-extrusion ring(s) 40, 50, 60, and/or 80. Being able to co-mold these components with the packer 32 allows the plug 10 to be shorter (e.g., about 15% of the length can be eliminated over current plugs). This has the benefit of reducing the amount of time required to mill up the plug 10.

Figure 10:
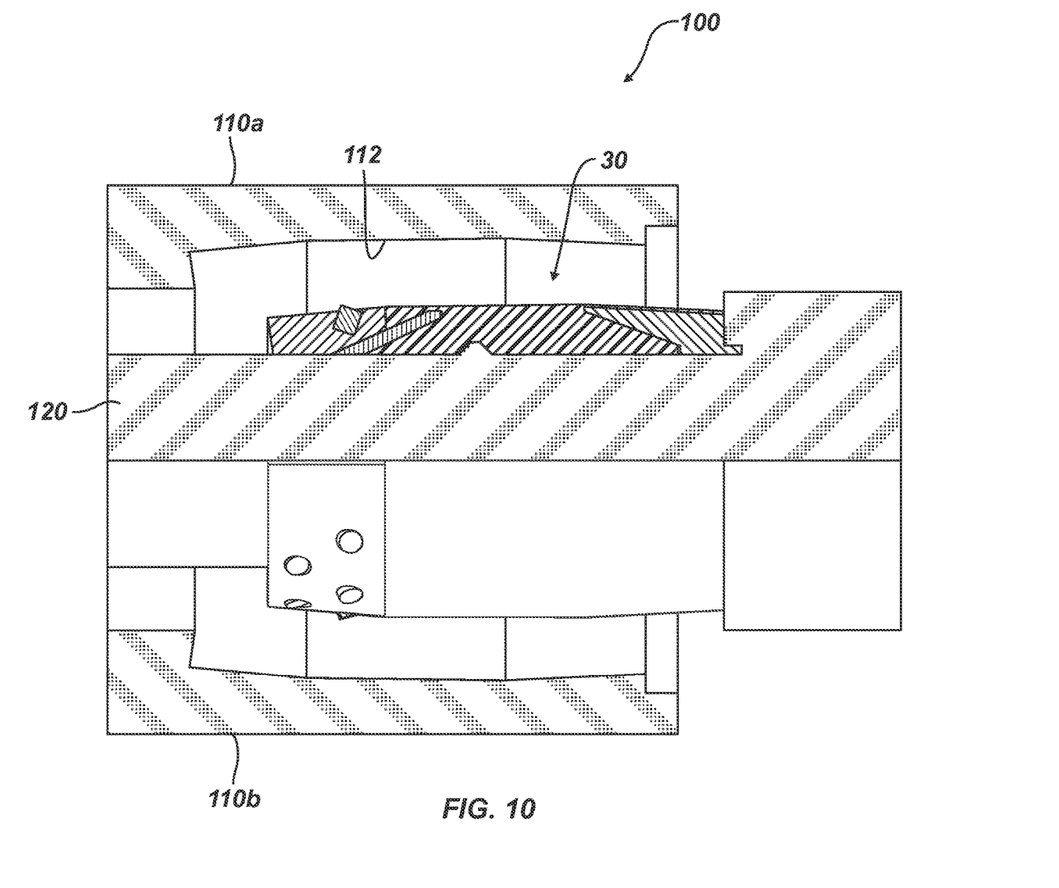
FIG. 10 diagrams a molding process for the disclosed element system.

As mentioned above, components (e.g., 40, 50, 60, 70, and/or 80) of the elements system 30 are co-molded with the packing element 32 by being placed in a mold prior to compression molding the packer 32. FIG. 10 merely diagrams some of the features of a molding system 100 to mold the disclosed element system 10. In general, the molding system 100 includes a mandrel 120 about which mold parts 110a-b fit. The mandrel 120 can be one component or can be composed of several components to facilitate assembly and removal. There are typically more than one mold part 110a-b, and each has a mold cavity 112 for containing molded elements.

The components (e.g., 40, 50, 60, 70, and/or 80) of the elements system 30 are installed on the mandrel 120 and contained in the mold parts 110a-b. Features (not shown) for injection molding, compression molding, etc. of the elastomer material of the packer 32 are then used to co-molded these element components with the packing element 32. Once the molding process is complete, the components (e.g., 40, 50, 60, 70, and/or 80) are contained or co-molded within the packer 32. After the compression molding, the element system 30 may be cured and finished according to standard practice and then installed on a tool mandrel (12) or the like.

To mold the components of the element system 30, various surfaces of the system 30 are prepped before compression molding so they can bond with the elastomer of the packer 32. To prepare the surfaces, bonding agents can be applied, surface treatment may be performed, holes or roughness can be added, or other methods may be used. For example, surfaces of the inner ring 40 and/or outer ring 50 on the element system 30 as in FIGS. 3A-3B, 4A-4C, etc. can be prepped with a bonding agent before compression molding so they can bond with the elastomer of the packer 32.

The bonding process can use a primer as an overcoat adhesive for bonding vulcanized and unvulcanized rubber compounds to rigid substrates. The bonding process can also use an adhesive to bond rubber compounds to a primed substrate or can use a non-conductive, one coat adhesive. Types of agents for the bonding process can be composed of polymers, organic compounds, and mineral fillers in an organic solvent and can include Chemlok® 205 Primer, 233X-LS Adhesive, and 258XN Adhesive, for example. (CHEMLOK is a registered trademark of Lord Corporation.)

It would be expected that more bonding of the elastomer to the surfaces and interstices of the components would produce better results. Instead, it may be preferred that the surfaces and interstices of the backup rings 40, 50, 60, and/or 80 be only partially prepped for bonding with the elastomer. The same preference can be applied to the slips 70 discussed previously.

If extensive preparation is done to produce strong bonding, for example, the inner ring 40 may simply remain a rigid body inside the elastomer as the packer 32 is compressed. Rather than expanding out and preventing extrusion, the inner ring 40 stays somewhat fixed and allows the elastomer to extrude over it. Only the outer ring 50 may expand out to prevent extrusion. Since this is not desirable, it may be preferred, for example, that the surfaces of the rings 40 and 50 are selectively treated for bonding with the elastomer of the packer 32.

A variation of manufacturing the co-molded element/back-up rings involves molding the components and elastomer separately and then bonding them together as if co-molded. For example, the back-up (or slip) rings 40, 50, 60, 80, and/or 70 are molded first in elastomer, and the remainder of elastomer is formed in a second mold. The two pieces are then bonded together.

Co-molding the components (i.e., rings 40, 50, 60, 80, and/or slip 70) into the packer 32 (by molding together or by separate molding then bonding) creates an element system 30 that has significantly higher flow resistance and is less prone to pre-setting. In fact, the performance during run in is expected to increase by more than 50%. In contrast to the conventional type of element, the disclosed element system 30 does not have back-up rings that will tend to flare out and create a sail effect at high flow rates, which causes pre-set or other catastrophic incidents. With the molded element system 30 of the present disclosure, the components 40, 50, 60, 70, and/or 80 are encapsulated into the elastomer during the molding process. Overall, the co-molded element system 30 can reduce the cost of the plug 10 and shorten the length.

Flow test data for the co-molded element system (30) indicates favorable performance during simulated pump-down and run-in testing. For example, a composite plug (10) with a co-molded element system (30) for 5½ casing was tested. The plug (10) had a 4.375-in OD and was inserted in the 5½ casing, which has a 4.670-in ID. Building up to a flow rate from 222.5 to 500-gal/min at ambient temperature in intervals of 30-minutes, the co-molded element system (30) of the present disclosure in simulated run-in and pump-down testing showed no signs of pressure loss and showed no damage after the test. The test conditions simulated run-in at equivalent line speeds ranging from 250 to 562-ft/min and pump-down at equivalent fluid velocities ranging from about 34 to 77-ft/sec. By comparison, a more conventional arrangement of an element system on a plug may tend to swab at lower flow rates (e.g., 350-gal/min), causing load against the lower Teflon ring and pressing it against the lower pedals. As noted above, this can be problematic during run-in and pump-down operations at high rates and may cause premature setting.

The foregoing description of preferred and other embodiments is not intended to limit or restrict the scope or applicability of the inventive concepts conceived of by the Applicants. It will be appreciated with the benefit of the present disclosure that features described above in accordance with any embodiment or aspect of the disclosed subject matter can be utilized, either alone or in combination, with any other described feature, in any other embodiment or aspect of the disclosed subject matter.

In exchange for disclosing the inventive concepts contained herein, the Applicants desire all patent rights afforded by the appended claims. Therefore, it is intended that the appended claims include all modifications and alterations to the full extent that they come within the scope of the following claims or the equivalents thereof.

What is claimed is:

1. A downhole tool, comprising:
   a packer positioned on the downhole tool, the packer being composed of packing material and being compressible on the downhole tool;
   at least one first backup petal ring having petals separated by interstices; and
   at least one first backup slip ring having slip members separated by interstices and disposed adjacent the at least one first backup petal ring,
   the at least one first backup petal and slip rings being co-molded together directly into a first end of the packer with the packing material molded into the interstices, and
   the at least one first backup petal and slip rings at least partially limiting extrusion of the packing material axially past the at least one first backup petal and slip rings beyond the first end of the packer.

2. The tool of claim 1, comprising:
   a mandrel on which the packer positions; and
   an activating element disposed on the mandrel and compressing the packer.

3. The tool of claim 1, wherein the interstices of the at least one first backup petal and slip rings define a plurality slots defined longitudinally therein and disposed about the at least one first backup petal and slip rings.

4. The tool of claim 3, wherein the slots of the at least first backup petal and slip rings are offset from one another.

5. The tool of claim 1, wherein at least a portion of the first end of the packer at least partially covers an exterior of the at least one first backup petal and slip rings.

6. The tool of claim 5, wherein the at least one first backup slip ring comprises an endwall exposed beyond the packing material.

7. The tool of claim 1, wherein the tool further comprises:
   a first cone disposed on the downhole tool adjacent the first end of the packer; and
   a first slip disposed on the downhole tool adjacent the first cone.

8. The tool of claim 7, further comprising at least one second element co-molded directly into the packing material at an opposite second end of the packer; and wherein the system further comprises:
   a second cone disposed on the downhole tool adjacent the at least one second element; and
   a second slip disposed on the downhole tool adjacent the cone.

9. The tool of claim 7, further comprising a second backup slip ring co-molded directly into the packing material at an opposite second end of the packer.

10. The tool of claim 1, wherein the at least one first backup slip ring comprises inserts disposed externally thereon.

11. The tool of claim 1, further comprising at least one backup wedge ring disposed adjacent the at least one first backup petal ring and co-molded directly into the packing material at the first end of the packer.

12. The tool of claim 1, further comprising at least one second element co-molded directly into the packing material at an opposite second end of the packer.

13. The tool of claim 12, wherein the at least one second element comprises at least one of:
   a second backup petal ring having petals separated by interstices; and
   a second backup slip ring having slip members separated by interstices and disposed adjacent the at least one first backup petal ring,
   the at least one second backup petal and slip rings being co-molded together directly into the packing material at the opposite second end of the packer.

14. The tool of claim 1, wherein the tool further comprises:
   at least one backup element disposed adjacent an opposite second end of the packer;

a cone disposed on the downhole tool adjacent the at least one backup element; and a slip disposed on the downhole tool adjacent the cone.

15. A method of manufacturing a packing element for a downhole tool, the method comprising:

positioning, adjacent one another in a mold, i) at least one first backup petal ring having petals separated by interstices and ii) at least one first backup slip ring having slip members separated by interstices;

molding a packer of packing material in the mold together with the at least one first backup petal and slip rings; and adapting the at least one first backup petal and slip rings to at least partially limit extrusion of the packing material axially past the at least one first backup petal and slip rings beyond a first end of the packer by co-molding the at least one first backup petal and slip rings directly into the packing material at the first end of the packer with the packing material molded into the interstices.

16. The method of claim 15, wherein positioning the at least one first backup petal and slip rings in the mold comprises positioning the at least one first backup petal and slip rings in the mold with a plurality slots for the interstices disposed longitudinally around a circumference of the at least one first backup petal and slip rings.

17. The method of claim 16, wherein positioning the at least first backup petal and slip rings in the mold with the slots being offset from one another.

18. The method of claim 15, wherein molding the at least one first backup petal and slip rings directly into the packing material at the first end of the packer comprises molding at least a portion of the first end of the packer at least partially covering an exterior of the at least one first backup petal and slip rings.

19. The method of claim 18, wherein molding the at least one first backup petal and slip rings directly into the packing material at the first end of the packer comprises exposing an endwall of the at least one first backup petal and slip rings beyond the packing material.

20. The method of claim 15, wherein molding the at least one first backup petal and slip rings directly into the packing material at the first end of the packer comprises preparing a surface of the at least one first backup petal and slip rings by performing at least one of applying a bonding agent to the surface, performing surface treatment to the surface, and adding texture, holes, or roughness to the surface.

21. The method of claim 20, wherein preparing the surface of the at least one first backup petal and slip rings comprises only partially preparing the surface for bonding with the packing material.

22. The method of claim 15, further comprising positioning the packer on a mandrel of the downhole tool.

23. The method of claim 22, wherein positioning the packer on the mandrel of the downhole tool further comprises:

positioning a cone on the downhole tool adjacent the at least one first backup petal and slip rings; and positioning a slip disposed on the downhole tool adjacent the cone.

24. A downhole tool having a packer manufactured according to the method of claim 15.

25. The method of claim 15, further comprising positioning inserts externally on the at least one first backup slip ring.

26. The method of claim 15, further comprising positioning at least one backup wedge ring disposed adjacent the at least one first backup petal ring and co-molding directly into the packing material at the first end of the packer.

27. The method of claim 15, further comprising co-molding at least one second element directly into the packing material at an opposite second end of the packer.

* * * * *